United States Patent
Grunke et al.

(10) Patent No.: US 7,178,808 B2
(45) Date of Patent: Feb. 20, 2007

(54) LAYER SYSTEM FOR THE ROTOR/STATOR SEAL OF A TURBOMACHINE

(75) Inventors: Richard Grunke, Lohhof (DE); Lothar Peichl, Dachau (DE); Klaus Schweitzer, Niederpoecking (DE)

(73) Assignee: MTU Aero Engines GmbH, Munich (DE)

( * ) Notice: Subject to any disclaimer, the term of this patent is extended or adjusted under 35 U.S.C. 154(b) by 251 days.

(21) Appl. No.: 10/456,959

(22) Filed: Jun. 9, 2003

(65) Prior Publication Data

US 2004/0012152 A1 Jan. 22, 2004

(30) Foreign Application Priority Data

Jun. 10, 2002 (DE) .......................... 102 25 532

(51) Int. Cl.
  *F16J 15/447* (2006.01)

(52) U.S. Cl. ...................... 277/409; 277/415
(58) Field of Classification Search .......... 277/409–415
See application file for complete search history.

(56) References Cited

U.S. PATENT DOCUMENTS

| 4,405,284 A | * | 9/1983 | Albrecht et al. ......... 415/174.4 |
| 4,422,648 A | | 12/1983 | Eaton et al. |
| 4,936,745 A | | 6/1990 | Vine et al. |
| 5,434,210 A | | 7/1995 | Rangaswamy et al. |
| 2002/0197503 A1 | | 12/2002 | Saruhan-Brings et al. |
| 2003/0054196 A1 | | 3/2003 | Lau et al. |

FOREIGN PATENT DOCUMENTS

| DE | 33 21 477 C2 | 9/1992 |
| EP | 0694627 | 1/1996 |
| EP | 0 965 730 A2 | 12/1999 |
| EP | 0 765 951 B1 | 12/2000 |

OTHER PUBLICATIONS

G. Johner and V. Wilms, *Keramikschichten zur Waermedaemmung in Turbinengehausen.*
C.J. Friedrich et al., Lanthanum Hexaaluminate Thermal Barrier Coatings, Ceramic Engineering and Science Proceedings, 2001, pp. 375–382, USA, XP009007230.

* cited by examiner

*Primary Examiner*—Vishal Patel
(74) *Attorney, Agent, or Firm*—Crowell & Moring LLP

(57) ABSTRACT

A layer system for the rotor/stator seal of a turbomachine, in particular of a gas turbine, is applied to a metallic component and can be run in with respect to a further component which can move relative to the metallic component, which, in order to improve the service life and run-in properties, is characterized by a bonding layer which is applied to the metallic component and a run-in coating which is applied to the bonding layer and comprises at least two layers, the first layer, which adjoins the bonding layer, being harder than the second layer, and the second layer having run-in properties.

30 Claims, 1 Drawing Sheet

LAYER SYSTEM FOR THE ROTOR/STATOR SEAL OF A TURBOMACHINE

This application claims the priority of Federal Republic of Germany Patent Document No. 102 25 532.6, filed Jun. 10, 2002, the disclosure of which is expressly incorporated by reference herein.

BACKGROUND OF THE INVENTION

The invention relates to a layer system for the rotor/stator seal of a turbomachine which is applied to a metallic component and can be run in with respect to a further component which can move relative to the metallic component, and to a turbomachine, in particular a gas turbine.

To keep undesirable gap losses which affect the efficiency of gas turbine engines at a low level, it is necessary to keep the gap between the rotor blades, which rotate at high speed, and the housing associated with the stator which surrounds the rotor small for as long as possible, i.e. to achieve the optimum possible sealing action.

It is known that the size of this gap is not constant but rather is subject to changes during the different operating phases of the gas turbine engine. For example, inter alia, the rotor blades, under high operating loads resulting from the thermal stresses and the centrifugal force, are subject to extension in the radial direction, while the housing is only subject to thermal expansion. These different thermal reaction characteristics lead to the observed changes in the gap size.

To ensure that the different thermal reaction characteristics of rotor blades and the housing and the requirement for a small gap size between the blade tips and the housing are taken into account, it is known to allow initial stripping or running-in to take place between the tips of the rotor blades and the surrounding housing. To prevent this from causing damages to the tips of the rotor blades and to the surrounding housing, an abrasive coating has often been applied to the tips of the rotor blades, while the surrounding housing is lined with a suitable run-in coating.

During the initial stripping or running-in of the blade tip at the run-in coating which has been introduced into the surrounding housing, the abrasive particles which have been applied to the blade tip cut or rub into the run-in coating, thereby abrading it.

To keep the wear to the blade tips as low as possible, it is also known to use relatively soft run-in coatings, i.e. run-in coatings with a low resistance to abrasion. Moreover, run-in coatings with a low resistance to abrasion provide a good thermal insulation and, on account of their good run-in properties, allow run-in depths of a few millimetres without damages to the blades.

A run-in coating of this type is described and illustrated in U.S. Pat. No. 5,434,210 and U.S. Pat. No. 4,936,745.

However, one of the disadvantages of the soft run-in coatings is that they are susceptible to erosion and have a poor ability to withstand temperature changes, leading to a restricted service life.

EP 0 765 951 B1 discloses a run-in coating system with three ceramic layers which are segmented and are made from hollow sphere powder. A drawback of this system is that the ceramic (base) layer which adjoins the bonding layer is relatively unresistant to erosion, on account of the hollow sphere powder. Moreover, on account of the interlayer, which is of graded composition, the system is expensive and complex to produce.

SUMMARY OF THE INVENTION

One of the objectives of the present invention is to provide a layer system which comprises a run-in coating which is optimized in terms of simple production, service life and run-in properties. Furthermore, it is intended to provide a turbomachine which includes a layer system which has been optimized in this way.

An advantage of the layer system according to the invention is that the run-in coating has a relatively hard lower layer with good resistance to erosion and ability to withstand temperature changes and therefore prolonged service life and improved durability, and a less hard covering layer with good run-in properties and good thermal insulation.

The hardness of the layers of the run-in coating decreases as the porosity of the layers increases. Consequently, the lower hardness of the second layer can be established by means of a porosity or by means of a porosity which is greater than that of the first layer. It is possible for the second layer, in one configuration, to have a porosity in the range from 20 to 35% by volume. In an expedient configuration, the first layer may have a porosity in the range from 5 to 20% by volume, in particular 15 to 20% by volume.

In a further configuration of the layer system, the porosity, in particular of the second layer, can be set by the addition of plastic particles, in particular of polyester. By burning these particles subsequently, the plastic particles which are vaporized or burnt create cavities.

The harder first layer may be made from a bulk, in particular melted and crushed, powder, which increases the resistance to erosion and therefore the service life of the layer system.

Unlike the bonding layer, which is usually metallic, the at least two layers of the run-in coating are predominantly ceramic.

The layers of the run-in coating may be based on yttrium-stabilized zirconia ($ZrO_2$) and/or lanthanum hexaaluminate. In particular lanthanum hexaaluminate is particularly resistant to undesirable sintering during operation in a turbomachine and the prolonged high temperatures.

That side of the harder first layer which faces the second layer is expediently positioned in such a way that under normal operating conditions a further component, in particular the rotor, cannot run into the first layer, with the result that the bonding, resistance to erosion and ability to withstand temperature changes of the first layer and therefore of the run-in coating as a whole are significantly improved, and the further component is protected. Moreover, the resulting geometric stability of the harder first layer and therefore of the run-in coating as a whole results in a uniformly good sealing during interaction with the further component (rotor).

In a further configuration, the bonding layer may, at least in regions, have a porosity which produces a greater roughness on the surface. The porosity of the bonding layer may decrease towards the component, resulting in a bonding layer which is graded in terms of its porosity. The fact that the porosity of the bonding layer decreases or drops towards zero in the direction of the component ensures gastightness, and the greater porosity towards the run-in coating, which produces roughness on the surface side, improves the bonding properties, with the result that the likelihood of the run-in coating flaking off is reduced and consequently the service life of the layer system as a whole is improved further.

Therefore, a layer system which comprises a run-in coating and has the abovementioned properties, namely a good ability to withstand temperature changes, a good resistance to erosion, good thermal insulation and good run-in properties, is achieved in a simple way.

The second layer is responsible for good thermal insulation and at the same time ensures the required good run-in properties of the run-in coating. On account of the good run-in properties, abrasion of the blade tip is minimized, with the result that the repair costs required for the blade tips are reduced. By contrast, the first layer ensures a good ability to withstand temperature changes and a high resistance to erosion, which in turn means that the performance of the gas turbine engine is maintained and longer service intervals are achieved.

Building up the run-in coating from at least a first and a second layer has the further advantage that, if the second layer with run-in properties is lost, only a limited gap widening occurs and therefore there is no likelihood of major losses of efficiency in the gas turbine engine.

There are also advantages with regard to the reparability of the run-in coating. For example, on account of the lower erosion resistance of the second layer, it is likely that this layer will wear earlier than the first layer. Consequently, repair measures are restricted to just this second layer. There is no need for cost-intensive renewal of the entire run-in coating.

Other objects, advantages and novel features of the present invention will become apparent from the following detailed description of the invention when considered in conjunction with the accompanying drawings.

DETAILED DESCRIPTION OF THE DRAWINGS

Figure 1:
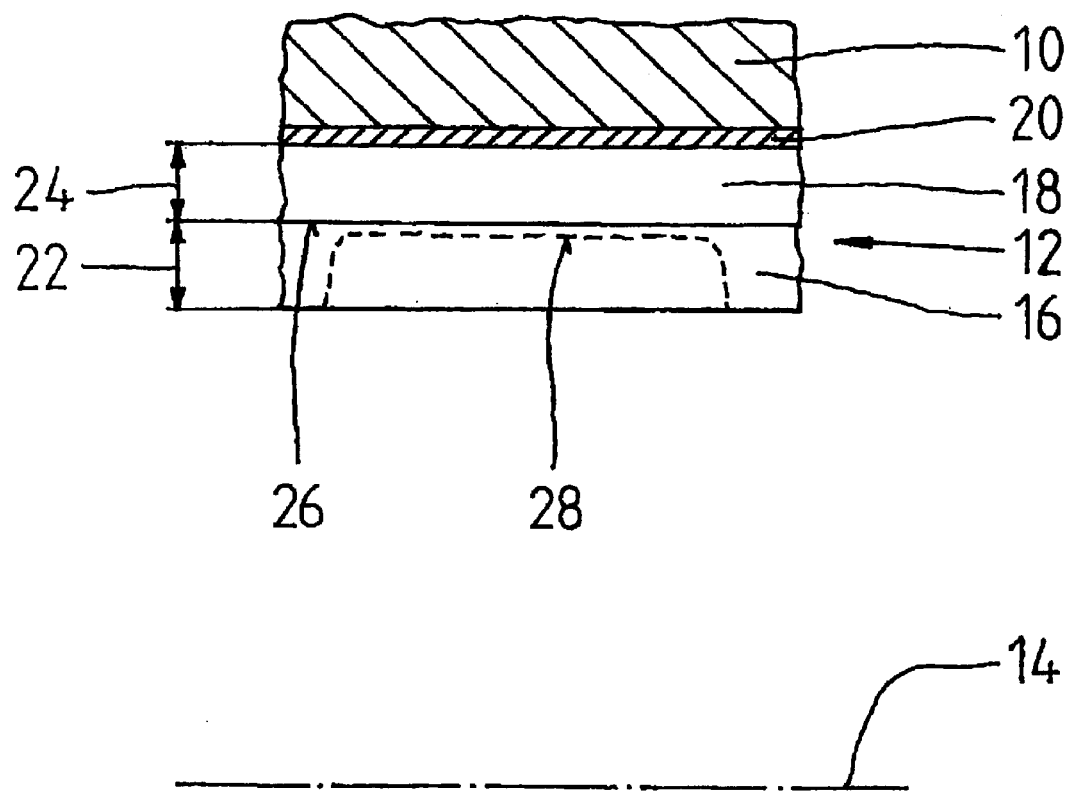
FIG. 1 shows a sectional illustration through part of a housing segment of a gas turbine having the sealing system of the present invention that comprises a run-in coating.

A housing segment 10, which is only partially illustrated in FIG. 1 and forms part of a stator, of a gas turbine engine is provided with a run-in coating, which is denoted overall by reference numeral 12, and a bonding layer 20 between the housing segment 10 and the run-in coating.

The run-in coating 12 is intended to allow a small radial gap to be achieved between the housing 10 and the rotor blades (not shown here) of the gas turbine engine.

With respect to an axis of rotation 14 of the gas turbine engine, the run-in coating 12 has a radially inner second layer 16 and a harder first layer 18 which lies further towards the outside in the radial direction.

The bonding of the run-in coating 12 to the housing 10 is ensured by means of the bonding layer 20 in the form of, for example, an MCrAlY alloy. The bonding layer 20, in the direction of the first layer 18 of the run-in coating 12, has a porosity which produces a defined roughness on the surface. The letter M in the MCrAlY alloy in particular represents Ni and/or Co. In the illustrated embodiment, the housing segment 10 includes, for example, alloys based on Ti, Ni or Co.

The second layer 16 of the run-in coating 12 is designed with a thickness 22 and has a lower hardness than the first layer 18, resulting in good run-in properties, and good thermal insulation. The thickness 22 of the layer 16 of the run-in coating 12 is selected in such a way that the thickness 22 corresponds to at least the maximum expected run-in depth of the tips of the rotor blades.

In the present embodiment, the second layer 16 is made from a porous yttrium-stabilized zirconia. If improved sintering resistance is desired, this layer 16, like the first layer 18, may be made from lanthanum hexaaluminate.

The hardness or resistance to abrasion of the second layer 16 of the run-in coating 12 is selected in such a way that, even at the expected run-in depth, which at most corresponds to the thickness 22 of the second layer 16, there is no damage to the blades.

The first layer 18 of the run-in coating 12, arranged between the second layer 16 and the housing 10, is also an yttrium-stabilized zirconia ($ZrO_2$) or alternatively a lanthanum hexaaluminate. Compared to the second layer 16, the first layer 18 of the run-in coating 12 has a greater hardness, which results, for example, from a lower porosity or from no porosity at all. The greater hardness of the first layer 18 improves the resistance to erosion, the ability to withstand temperature changes and therefore the durability of the run-in coating 12.

The thickness 24 of the first layer 18 is 0.2 to 10.0 mm, with the upper limit in particular taking account of the conditions in large, stationary gas turbines. A preferred range for aircraft engines is 0.2 to 2.0 mm, in particular 0.5 to 0.8 mm. A side 26, which faces the second layer 16, of the first layer 18 is positioned in such a way, i.e. its diameter is selected in such way, that under normal operating conditions there is no likelihood of a component which moves relative to it running into the harder, first layer 18, as indicated by the run-in track 28 in dashed lines. The running-in may originate, for example, from a blade tip or what is known as a sealing fin of a labyrinth seal.

The harder, first layer 18 of the run-in coating 12 therefore ensures that premature wear to the run-in coating 12 is avoided and, in conjunction with the good ability to withstand temperature changes, thus ensures longer service intervals for the gas turbine engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A layer system for a rotor/stator seal of a turbomachine, comprising:
   a bonding layer applied to a metallic component of the turbomachine; and
   a run-in coating applied to the bonding layer, the run-in coating including,
   a first layer adjoining the bonding layer, and
   a second layer, wherein the first layer has a hardness that is greater than a hardness of the second layer, and wherein the second layer has properties suitable for run-in, wherein at least one portion of the bonding layer includes porosity which produces a roughness on a surface of the bonding layer, and wherein the porosity of the bonding layer increases in the direction of the rotor.

2. A turbomachine comprising:
   a rotor which rotates about an axis of rotation;
   a stator which surrounds the rotor; and
   a layer system according to claim 1 which is applied to regions of the stator in order to form a seal between the rotor and the stator and allows the rotor to run in.

3. A layer system for a rotor/stator seal of a turbomachine, comprising:
   a bonding layer applied to a metallic component of the turbomachine; and
   a run-in coating applied to the bonding layer, the run-in coating including,
      a first layer adjoining the bonding layer, and
      a second layer, wherein the first layer has a hardness that is greater than a hardness of the second layer and wherein the second layer has properties suitable for run-in; and
   further wherein the bonding layer includes porosity that increases in the direction of the rotor.

4. The layer system according to claim 3, wherein the second layer has a porosity that is greater than a porosity of the first layer.

5. The layer system according to claim 4, wherein the second layer has a porosity in the range from 20 to 35% by volume.

6. The layer system according to claim 5, wherein the first layer has a porosity in the range from 5 to 20% by volume.

7. The layer system according to claim 5, wherein the first layer has a porosity in the range from 15 to 20% by volume.

8. The layer system according to claim 4, wherein the second layer includes pores formed by burnt plastic particles.

9. The layer system according to claim 8, wherein the plastic particles include polyester particles.

10. The layer system according to claim 3, wherein the first layer includes melted and crushed powder.

11. The layer system according to claim 3, wherein the run-in coating includes at least one of yttrium-stabilized zirconia ($ZrO_2$) and lanthanum hexaaluminate.

12. The layer system according to claim 4, wherein the second layer has a thickness of from 0.2 to 10.0 mm.

13. The layer system according to claim 12, wherein the second layer has a thickness of from 0.2 to 2.0 mm.

14. The layer system according to claim 13, wherein the second layer has a thickness of from 0.5 to 0.8 mm.

15. The layer system according to claim 4, wherein a side of the first layer which faces the second layer is positioned to avoid rotor run-in into the first layer under normal operating conditions.

16. The layer system according to claim 3, wherein the bonding layer includes a metallic material.

17. The layer system according to claim 16, wherein the bonding layer includes MCrAlY alloy.

18. The layer system according to claim 3, wherein the bonding layer has a thickness of from 0.25 to 0.40 mm.

19. A turbomachine comprising:
   a rotor which rotates about an axis of rotation;
   a stator which surrounds the rotor; and
   a layer system according to claim 3, which is applied to regions of the stator in order to form a seal between the rotor and the stator and allows the rotor to run in.

20. A method for making a layer system for a rotor/stator seal of a turbomachine; comprising the steps of:
   applying a bonding layer to a metallic component of the turbomachine, wherein a porosity of the bonding layer increases in the direction of the rotor;
   applying a run-in coating to the bonding layer;
   providing the run-in coating with:
      a first layer adjoining the bonding layer; and
      a second layer, wherein the first layer has a hardness that is greater than a hardness of the second layer, and wherein the second layer has properties suitable for run-in.

21. The method according to claim 20, further comprising constructing the second layer with a porosity that is greater than a porosity of the first layer.

22. The method according to claim 21, further comprising constructing the second layer with a porosity in the range from 20 to 35% by volume.

23. The method according to claim 21, further comprising constructing the first layer with a porosity in the range from 5 to 20% by volume.

24. The method according to claim 21, further comprising constructing the first layer with a porosity in the range from 15 to 20% by volume.

25. The method according to claim 21, further comprising producing the porosity of the second layer by adding plastic particles and subsequently burning or evaporating the plastic particles.

26. The method according to claim 21, further comprising producing the porosity of the second layer by adding polyester particles and subsequently burning or evaporating the polyester particles.

27. The method according to claim 20, further comprising producing the first layer from melted and crushed powder.

28. The method according to claim 20, further comprising producing the run-in coating from at least one of yttrium-stabilized zirconia ($ZrO_2$) and lanthanum hexaaluminate.

29. The method according to claim 20, further comprising positioning a side of the first layer which faces the second layer to avoid rotor run-in into the first layer under normal operating conditions.

30. A method of making a turbomachine, comprising:
   providing a rotor which rotates about an axis of rotation;
   providing a stator which surrounds the rotor; and
   making a layer system according to claim 20,
   applying the layer system to regions of the stator in order to form a seal between the rotor and the stator and allows the rotor to run in.

* * * * *